T. C. DINGMAN
E. F. COOK
INVENTORS

ATTORNEYS

United States Patent Office 2,708,959
Patented May 24, 1955

2,708,959

ADJUSTABLE SEAT MOUNTING FOR VEHICLES

Thomas C. Dingman, Dearborn, and Ernest F. Cook, Detroit, Mich., assignors to Ford Motor Company, Dearborn, Mich., a corporation of Delaware Application September 6, 1952, Serial No. 308,214

1 Claim. (Cl. 155—14)

This invention relates generally to adjustable seat mountings for vehicles and has particular reference to seat mountings of the anti-friction type.

A principal object of the present invention is to provide an adjustable seat mounting designed to reduce the frictional resistance to fore and aft adjustment to a minimum, and at the same time to stabilize the mounting by providing proper support in lateral and vertical directions. A further object is to attain the above advantages with a relatively simple and inexpensively manufactured construction so designed as to provide for free movement during adjustment even when under load.

A still further object of the invention is to provide an adjustable seat mounting in which a plurality of separate units are provided for adjustably supporting the vehicle seat, and in which the tracks of the various units may differ in shape so as to provide for differential vertical movement between the front and back of the vehicle seat as the seat is adjusted longitudinally of the vehicle.

Other objects and advantages of this invention will be made more apparent as this description proceeds, particularly when considered in connection with the accompanying drawings, in which.

Figure 1:
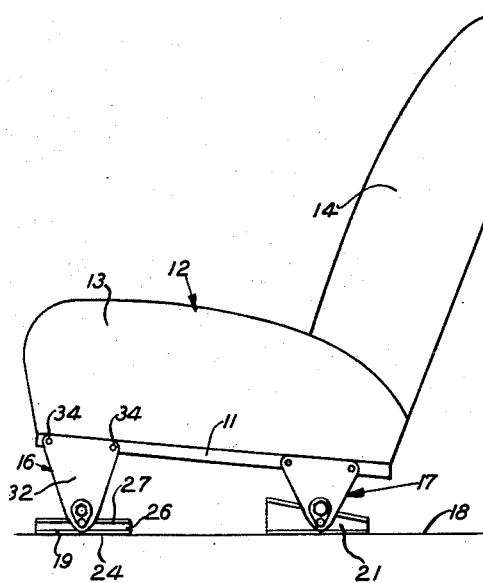
Figure 1 is a side elevational view of the front seat of a motor vehicle incorporating the present invention.

Referring now to the drawings, and particularly to Figure 1, the reference character 11 indicates the frame of the front seat 12 of a motor vehicle. The seat 12 includes a seat cushion 13 and a seat back 14 mounted upon the seat frame.

In the illustrated embodiment of the invention, each side of the front seat 12 is supported upon a front mounting unit 16 and a rear mounting unit 17 for fore and aft adjustment of the vehicle seat along the floor 18 of the vehicle. If desired, the front and rear mounting units could utilize a common seat track, but may also use separate tracks as illustrated here.

The front and rear tracks may be identical if uniform action is desired between the front and rear portions of the seat, or, if desired, the track units may vary in shape so as to provide differential action between the front and rear of the vehicle seat. As best seen in Figure 1, the front track 19 is of uniform height so that the height of the forward portion of the seat cushion 13 remains constant as the seat is adjusted longitudinally. On the other hand, the rear track 21 is inclined upwardly from its rearward to its forward end so that the rearward portion of the seat cushion 13 will be elevated as the seat is adjusted forwardly and will be lowered as the seat is adjusted rearwardly. Other configurations and arrangements of tracks are possible, and if desired the track sections may be curved as well as straight as shown.

With the exception of the inclination of the rear track 21, and the height of the brackets supporting the seat upon the tracks, the front and rear mounting units 16 and 17 are identical, and consequently only the front unit 16 will be described in detail.

Figure 2:
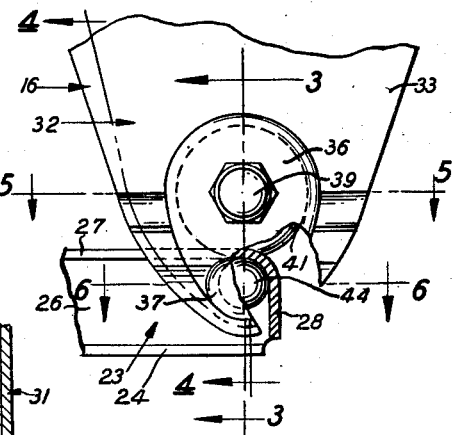
Figure 2 is an enlarged side elevational view of the front mounting unit shown in Figure 1.
Figure 3:
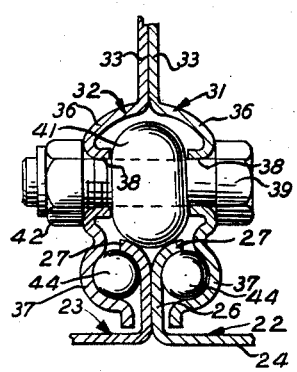
Figure 3 is a vertical cross-sectional view taken on the plane indicated by the line 3—3 of Figure 2.
Figure 6:
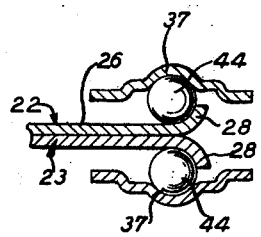
Figure 6 is a horizontal cross-sectional view taken on the plane indicated by the line 6—6 of Figure 2.

With reference now to Figures 2, 3 and 6, it will be seen that the front track 19 is formed of inner and outer track sections 22 and 23. These track sections are identical but are arranged in back to back fashion. Each track section comprises a horizontal mounting flange 24 arranged to be bolted to the vehicle floor 18, an upright web 26, and a rolled upper flange 27. The adjoining webs 26 of the two track sections 22 and 23 are welded together to form a unit. As best seen in Figures 2 and 6, the forward and rearward ends of the track sections 22 and 23 are formed with rolled retaining flanges 28.

It will be noted that the track assemblies are compact and relatively low in overall height. This is advantageous since during full forward or rearward adjustment, the rearward end of the rear track 21 and the forward end of the front track 19 respectively may project beyond the edge of the seat and be visible. The overall height of the tracks being only in the neighborhood of approximately 3/4 of an inch, and they can be largely concealed by the insulation, padding and a carpet utilized on the vehicle floor 18.

Supporting the forward portion of the vehicle seat 12 upon the front track 19 is a supporting and guiding assembly including complementary shaped inner and outer brackets 31 and 32. The upper flanges 33 of the brackets are arranged in juxtaposition and are secured to the frame 11 of the vehicle seat by suitable fastening means 34. Adjacent their lower ends the brackets 31 and 32 are formed with cup-shaped socket portions 36 merging at their lower ends into semispherical shaped retaining portions 37. The socket portions 36 are formed with aligned flanged openings 38 therethrough for receiving a bolt 39 forming a pivotal axis for a roller 41. The bolt is held in place by means of a nut 42. In addition to forming a pivot shaft for the roller 41 the bolt 39 serves to clamp the two brackets 31 and 32 of the support assembly together.

In cross-section, the roller 41 has an arcuate peripheral surface adapted to be supported upon the rolled upper flanges 27 of the track sections 22 and 23. It will be apparent from the foregoing that the weight of the vehicle seat is supported upon the tracks by means of the rollers 41 so that longitudinal adjustment of the seat may be affected with a minimum of friction.

Anti-friction balls 44 are received within the semispherical shaped portions 37 of the supporting brackets 31 and 32. The balls 44 rollably engage the webs 26 and rolled upper flanges 27 of the track sections 22 and 23. It will be noted the curvature of the rolled flanges 27 corresponds to the curvature of the balls 44 to promote relative sliding movement of the seat with a minimum of friction. Suitable lubrication is of course provided between the track sections, anti-friction balls and roller.

It will be apparent from the foregoing that the anti-friction balls 44 effectively stabilize the mounting units both laterally and vertically and prevent wobbling or lateral displacement of the seat relative to the vehicle floor.

Figure 4:
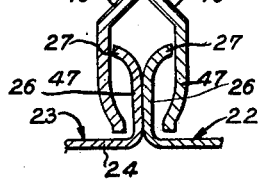
Figure 4 is a vertical cross-sectional view taken on the plane indicated by the line 4—4 of Figure 2.
Figure 5:
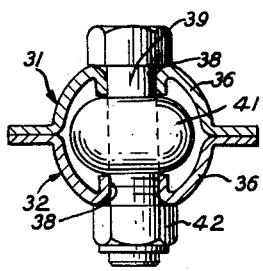
Figure 5 is a horizontal cross-sectional view taken on the plane indicated by the line 5—5 of Figure 2.

Attention is now invited to Figure 4 for an understanding of the configuration of the supporting brackets 31 and 32 forwardly and rearwardly of the socket and semispherical portions 36 and 37 thereof. In this area, the vertical upper flanges 33 of the supporting brackets 31 and 32 continue downwardly in juxtaposition to each other to approximately the center line of the pivot shaft 39 for the roller 41. Therebelow the brackets have diverging inclined intermediate portions 46 merging into generally vertical marginal flanges 47. Sufficient clearance is thus provided between the intermediate portions 46 and the lower flanges 47 of the brackets 31 and 32 to accommodate the track sections 22 and 23, thus enabling the supporting brackets and the anti-friction balls and roller carried thereby to be moved to the extreme end of the track without interference. Movement beyond the end of the track is prevented by means of the end flanges 28 on the track sections which engage the anti-friction balls 44 and limit further movement.

It will be understood that the invention is not to be limited to the exact construction shown and described, but that various changes and modifications may be made without departing from the spirit and scope of the invention, as defined in the appended claim.

What is claimed is:

An adjustable mounting for a motor vehicle seat comprising a pair of complementary tracks having oppositely projecting horizontal base flanges for attachment to the vehicle floor, said floor tracks having adjacent vertical flanges terminating at their upper edges in integral arcuate outwardly rolled upper flanges, a pair of complementary generally V-shaped brackets having vertical flanges positioned adjacent each other and secured at their upper edges to said motor vehicle seat, said last-mentioned vertical flanges having opposed cup shaped portions facing each other to form a hollow chamber, said cup shaped portions having horizontally aligned apertures formed centrally therethrough and provided with short inturned sleeves, a pivot bolt extending through said sleeves, a nut on the end of said bolt clamping said brackets together, a roller in said chamber journaled on said pivot bolt and restrained against axial movement thereon by engagement with the inner ends of said sleeves, the peripheral surface of said roller being arcuate in cross section and having rolling engagement with the upper surfaces of the rolled upper flanges of said tracks, said brackets being formed with smaller semispherical sockets facing each other in horizontal alignment and positioned vertically beneath said cup shaped portions, anti-friction balls in said sockets engaging the vertical flanges and upper rolled flanges of said tracks having outwardly rolled arcuate flanges at the opposite ends thereof engageable with said anti-friction balls to limit lengthwise movement of said seat brackets relative to said tracks in each direction, the portions of the vertical flanges of said seat brackets on opposite sides of said cup shaped portions and semispherical sockets being flared outwardly and spaced apart a distance sufficient to clear the upper and end outwardly rolled flanges of said floor tracks.

References Cited in the file of this patent

UNITED STATES PATENTS

| | | |
|---|---|---|
| 2,095,442 | Jacobs | Oct. 12, 1937 |
| 2,263,834 | Anderson | Nov. 25, 1941 |
| 2,299,928 | Potter | Oct. 27, 1942 |
| 2,336,433 | Woina | Dec. 7, 1943 |
| 2,417,523 | Simpson | Mar. 18, 1947 |
| 2,563,220 | Doty | Aug. 7, 1951 |